(12) United States Patent
Benmouyal et al.

(10) Patent No.: US 6,417,791 B1
(45) Date of Patent: Jul. 9, 2002

(54) DELTA FILTER WITH AN ADAPTIVE TIME WINDOW FOR PROTECTIVE RELAYS

(75) Inventors: Gabriel Benmouyal, Boucherville (CA); Jeffrey B. Roberts, Viola, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 09/892,016

(22) Filed: Jun. 25, 2001

(51) Int. Cl.[7] ............................................... H03M 1/48
(52) U.S. Cl. ....................................................... 341/111
(58) Field of Search ................................. 341/111, 112, 341/116, 143; 323/276

(56) References Cited

U.S. PATENT DOCUMENTS 5,953,380 A * 9/1999 Ikeda .......................... 375/346

FOREIGN PATENT DOCUMENTS

JP 404294283 * 10/1992 ......... G01R/21/133

* cited by examiner

Primary Examiner—Peguy JeanPierre

(57) ABSTRACT

A delta filter for use in a protective relay which includes an input circuit for receiving phasor signals representative of electrical signal quantities on the power line. A difference value, if any, is determined between the phasor signals at a present time and the phasor signals at a past point in time (delayed), the delay typically being one cycle. A first incremental output value is produced if there is a difference. When a power line disturbance is first noted by the recognition of a first incremental output value, the phasor signal value at the beginning of the disturbance is stored and then used as a reference value for comparison with subsequent present time phasor signals to determine continuing change in power system condition.

9 Claims, 2 Drawing Sheets

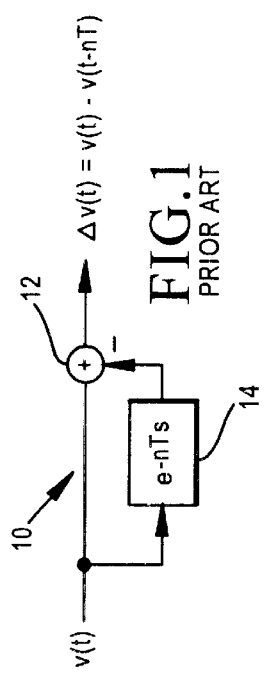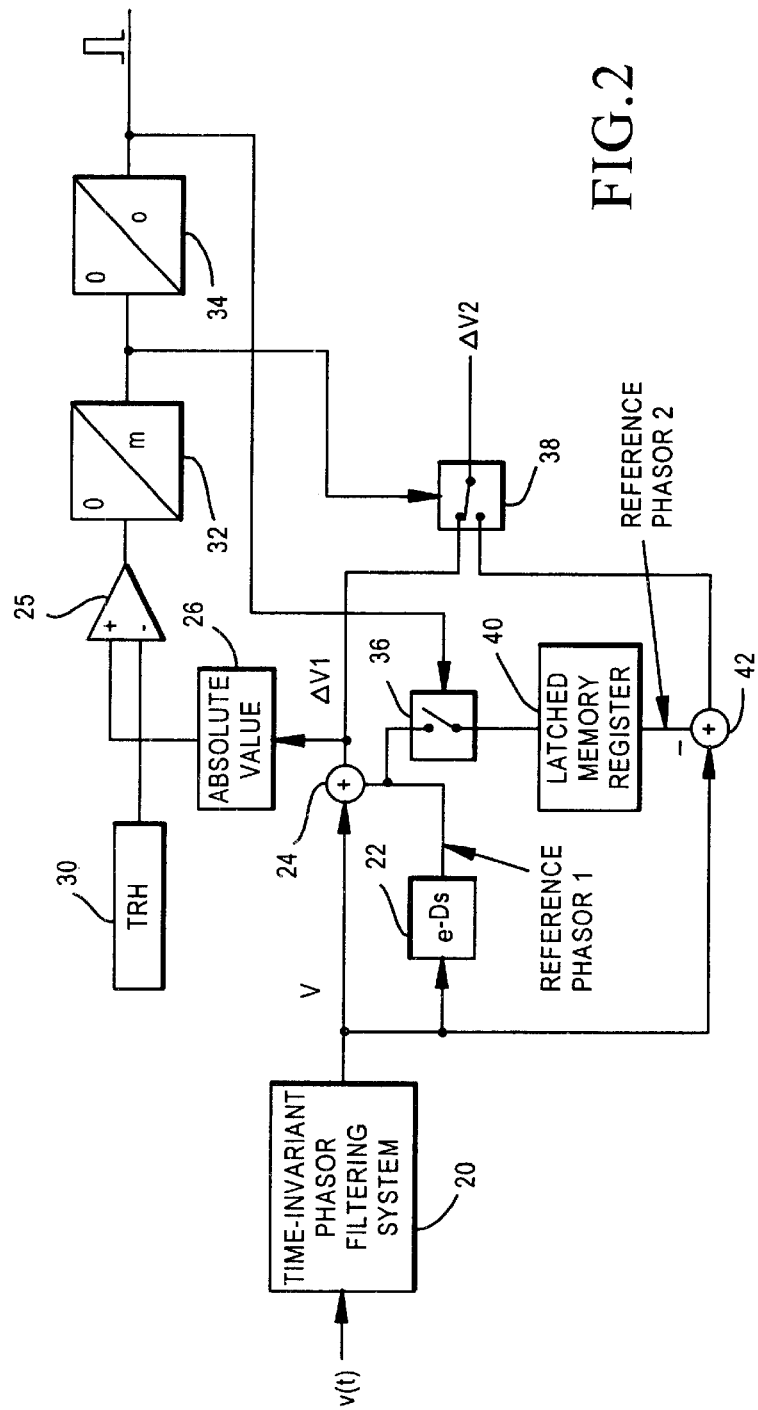

DELTA FILTER WITH AN ADAPTIVE TIME WINDOW FOR PROTECTIVE RELAYS

TECHNICAL FIELD

This invention relates generally to protective relays used in power systems, and more specifically concerns a new delta filter for use in determining incremental changes in voltage and currents on a power line.

BACKGROUND OF THE INVENTION

For at least the past 20 years, protective relays for power systems have used what are generally referred to as delta filters (also referred to as "Δ" filters) to measure change in voltage and current quantities on a power line due to faults/disturbances on the line. In such applications, delta filters are responsive to voltage or current time-varying waveforms from the power line, and in operation subtract the waveform present at a selected interval of time prior to the present time from the present time waveform. This is accomplished by a delay characteristic (capability) of the filter. The selected interval of time is equal to a selected integral multiple of the time-varying voltage/current waveform time period. In most of the early delta filter applications, the delay was one power system cycle.

Such delta filters are quite secure under steady-state conditions. With no change in the waveforms when there is no disturbance or fault event, the output of the delta filter will be zero. Then, when an event or fault on the power line occurs, resulting in a change in the current or voltage waveform, the delta filter will have a non-zero output, the magnitude of which is indicative of the significance of the actual change in the power signal system as represented by the voltage and/or current values.

An example of this initial type of delta filter is shown in FIG. 1. Referring to FIG. 1, the filter, shown generally at 10, is responsive to a sinusoidal voltage v(t), which is shown, or current i(t) signal obtained from the power line. The same filter technique can be used with other quantities, including frequency or distance measurements. The present or immediate time value of the input signal is then subtracted by a subtract or difference element 12 from a time delayed signal, to provide an output Δv(t) or Δi(t), which is the difference between the two signals applied to the difference element 12. A time delay element 14 produces the delayed signal on a continuous basis, with a time interval between the delayed signal and the present time signal equal to a selected multiple of the period of the input signal. The delay produced by the element 14 is referred to as the delta filter time-window. The delayed signal from time element 14 is referred to as the reference signal. The Laplace transform representation of the delay is $e^{-nTs}$, where n is the selected multiple of the input signal period, T is the input signal period and s represents a standard Laplace mathematical operator.

In the development of delta filters, phasor quantities have been used as inputs to the delta filter, rather than time-varying input waveforms from the power line. Positive sequence voltage and current phasors are often used in such embodiments. In one possible embodiment, rotating phasors are used, while in another embodiment, the phasors are time-invariant. Both systems require an input filtering system to produce the desired phasors for the delta filter system.

An example of such an input filtering system is a finite-response pair of orthogonal filters which produce a phasor output which rotates counterclockwise in the complex plane by an angle equal to 360° divided by the number of samples N per cycle acquired from the waveform v(t) or i(t) from the power line. Under steady-state power system conditions, the rotating phasor output has the same coordinates at every multiple of the waveform period. In order to be able to subtract two phasors in a delta filter, the delta filter time window must be equal to an integral multiple of the incoming signal period. The rotating phasor can be made time-invariant by multiplying (in the filter system) the Fourier filter output by the same angle rotating in the clockwise direction.

A time-invariant phasor does not change its position with time in the complex plane, unless the frequency of the incoming signal undergoes some changes. The incoming (present) phasors and the time-delayed phasors in the time-invariant arrangement will have exactly the same coordinates, if there is no change on the electrical network, and will hence produce a zero delta filter output. One advantage with such a system is that the time window for the time-invariant phasor delta filter can basically assume any value. A time delay of a selected amount between 0.5 and 3 cycles can be typically accommodated by a delta filter. With such a system, the filter output will be zero when the time-invariant phasor does not change, i.e. for when there is no change in the electric power signals on the line. The output of the filter will be other than zero when there is a disturbance due to a fault on the line.

All of the above-described delta filter approaches, however, have difficulty in those situations where the fault or disturbance on the power line changes with time, i.e. an evolving fault, such as from a single-phase-to-ground fault (A-ground) to a different type of fault, e.g. an A-B-ground fault. When a single line-to-ground fault occurs in the power system, the delta filter associated with the particular faulted phase (line) will produce a non-zero sinusoidal output for a particular interval of time equal to the delta filter time window.

When the fault evolves, however, the reference signal for the delta filter for the non-faulted phase will be contaminated with fault quantities related to the original fault. This leads to inaccurate results relative to the determination of the evolving fault.

When successive network power changes occur (an evolving fault), detection with a delta filter is as a result made with a reference phasor which is not stationary in time, and the resulting outputs, which are obtained at different times, cannot be correlated because of the differences in the reference signal. The detection of any type of evolving fault, where the reference for another phase is contaminated by a previous condition such as a fault, leading to the successive changes in the incoming signal to the delta filter, is affected. One example is a forward fault which changes into a reverse fault. Another example, as discussed above, is a single phase-to-ground fault which evolves to a phase-to-phase-to-ground fault. It would be desirable to have a delta filter system in which evolving faults could be accurately detected by solving the problem of the changing reference phasor.

DISCLOSURE OF THE INVENTION

Accordingly, the present invention is a delta filter system for use in a protective relay for power systems, comprising: an input portion for receiving electrical signal values representative of selected electrical quantities present on a power line which change in response to a change in the power system condition; a first comparison element for comparing said electrical signal values at a present point in time with said electrical signal values at a selected past point in time, i.e. an earlier point in time, wherein the selected past point in time values are provided by a delay element and function as reference values; circuit means for providing a first incremental signal quantity output if the past and present values are different, the existence of a first incremental signal quantity being indicative of a change in the condition of the power system, possibly a fault; a memory for storing the present time electrical signal value following the appearance of said first incremental signal quantity output; and means using said stored signal value as a fixed reference value for future comparisons in a second comparison element beyond the point in time of the appearance of said first incremental signal quantity output to produce a second incremental signal quantity output if the power system continues to change.

BRIEF DESCRIPTION OF THE DRAWINGS

FIG. 1 is a simplified block diagram of a prior art delta filter.

FIG. 2 is a block diagram of one embodiment of the delta filter system of the present invention.

BEST MODE FOR CARRYING OUT THE INVENTION

Figure 3:
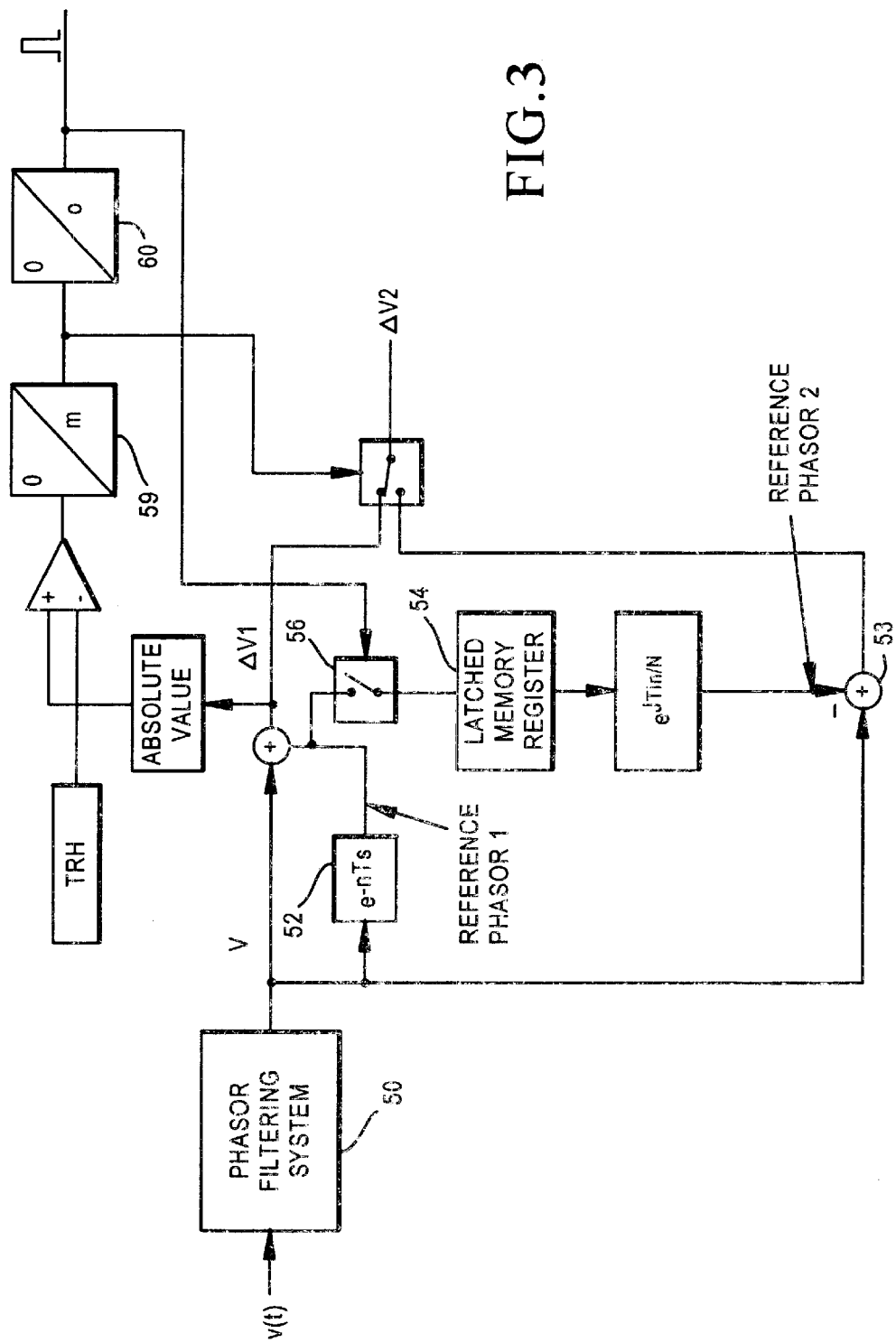
FIG. 3 is a block diagram of another embodiment of the delta filter system of the present invention.

FIG. 2 shows one embodiment of the delta filter system of the present invention. The input to FIG. 2 is a time-varying voltage v(t) or current i(t) signal. In FIG. 2, the input is shown as v(t), but it could be i(t) or even other time-varying inputs, including difference inputs, as will be clarified hereinafter. The time-varying input signal from the power line is applied to a conventional time invariant phasor filtering system 20. One example of such a filter, as indicated above, uses a finite impulse response pair of orthogonal filters which produces phasor quantities which rotate counterclockwise in the complex plane by an angle equal to 360° divided by the number of samples per cycle acquired for the incoming waveform.

The phasor output signal from the filter system 20 is then applied to the delay element 22 and as one input (the present time phasor value) to subtract circuit 24. The delay in Fourier terms is $e^{-Ds}$, where D is the amount of the delay and s is the Laplace operator. The delay will be between 0.5 and 3 cycles, with a typical delay of one cycle. The output of delay element 22 is referred to as the first reference phasor (reference phasor 1). This first reference phasor is applied to the other input of subtract circuit 24. Any difference between the first reference phasor value and the present time phasor value appears at the output of subtract (difference) circuit 24. This difference phasor output, referred to as a first incremental quantity $\Delta V1$, is then applied to an absolute value circuit 26, which produces an absolute magnitude value from the difference phasor output.

The output of circuit 26 is applied to one input of a comparator 28. The other input to comparator 28 is a selected threshold value from circuit 30. A typical threshold value will be between 0.5–10% of the nominal phasor magnitude. As soon as the phasor absolute magnitude value becomes greater than the threshold value, as determined by comparator 28, the output of comparator 28 goes high, indicating a change in the power system conditions satisfying the threshold requirement. This output of comparator 28 is applied to an instantaneous-pickup timer 32. Timer 32 picks up upon the occurrence of an output from comparator 28 and remains picked up for a selected interval of time m beyond the time that the output from comparator 28 goes low again. This interval of time, sometimes referred to as the drop-out time, will typically be in the range of 0.5–4 cycles.

The output from timer 32 is applied to an edge-triggered pulse generator 34. The edge-triggered pulse generator 34 produces an output pulse upon the occurrence of the rising edge of an input signal. The duration of the pulse output from generator 34 is, in the embodiment shown, one processing interval. The output of pulse generator 34 is applied to a first switch 36, while the output of timer 32 is applied to a second switch 38. Switch 36 is normally closed, as shown. The signal from pulse generator 34 momentarily opens switch 36, for the duration of the pulse, setting the latch and establishing the value of the first reference phasor at the time that a change in system condition is first indicated by an output from comparator 28 in latched memory register 40. The first reference phasor in addition is applied to the one input of difference circuit 24.

The first reference phasor value at the point in time when the system first begins to change becomes the second reference phasor (reference phasor 2) for a second delta filter. Accordingly, while the first reference phasor begins to change due to the system change, following the time window period of the first delta filter, the second reference phasor remains at the initial, nondisturbed value. The latched phasor value from memory 40 is applied to one input of a difference circuit 42 as a reference signal. The other input is the present time phasor signal, the same signal which is applied to the present time phasor input of difference circuit 24. The output from difference circuit 42 is applied to switch 38.

The output from timer 32 is applied to the control input of switch 38, closing the switch from difference circuit 24 to difference circuit 42. Switch 38 is usually connected (default position) to the output of difference circuit 24. The switch arm is thus moved to the output of difference element 42 during the time that there is an output from timer 32, i.e. during the time when the absolute value of the output of difference circuit 24 is greater than the threshold value from threshold circuit 30 and the dropout time of timer 32. The output of switch 38 is a second incremental output quantity, known as $\Delta V2$. The magnitude of the second incremental quantity is equal to the present time phasor value minus the value of the second reference phasor when the output of timer 32 is high. Hence, during the time that switch 38 is closed by the output of timer 32, $\Delta V2$ is provided, using the second reference phasor, which is a fixed reference phasor.

The system of FIG. 2 thus produces a conventional delta output incremental quantity $\Delta V1$ using a moving first reference phasor and also an incremental quantity $\Delta V2$ using a stationary, i.e. fixed, second reference phasor. The second reference phasor is fixed for as long as the output of timer 32 remains picked up. When the magnitude of $\Delta V1$ decreases to less than the threshold value from circuit 30, for a time at least equal to the dropout time of timer 32, $\Delta V2$ again becomes equal to $\Delta V1$, as the switch arm in switch 38 moves back to its default position. The output quantity $\Delta V1$ thus keeps track of power system changes in conventional fashion, while quantity $\Delta V2$ remains fixed during system changes at the particular phasor value in existence just prior to the beginning of the system change, so that successive system changes will be processed against the same, unchanged original reference phasor, which results in more accurate detection and recognition of evolving faults.

While FIG. 2 does include a time-invariant filter system to produce phasor values from power line values, it should be understood that time-varying voltage and current values from the power line could be used directly. Such phasor values could be useful in a microprocessor-type relay.

FIG. 3 shows a variation of FIG. 2, in which a phasor filtering system 50 is responsive to time-varying voltage information on the power line to produce a rotating phasor output. The time delay element 52 for the rotating phasor embodiment is different than that for the embodiment of FIG. 2. The delay to establish the fixed time window must be equal to an integral multiple of the period of the time-varying input waveform. This is indicated in the time delay element 52 by Fourier notation $e^{-nTs}$. In this embodiment, the phasor values in latched memory register 54 must be synchronized with the incoming phasor for accurate comparison by difference element 58. This synchronization is accomplished by forcing the memorized phasor to rotate equivalently to the present time phasor input from the delay element 52.

This is accomplished by multiplying the memorized phasor in register 54 by the rotating phasor, $e^{j(2\pi n/N)}$, where n takes the periodic value of 1 to N and resets to 1 after one period; n starts at one processing interval following the detection of system charge and latching of the phasor in register 54. The system of FIG. 3, like the system of FIG. 2, produces first incremental values ΔV1, using a first reference phasor, and second incremental values ΔV2, using a second reference phasor, during the time following the recognition of a change in the system voltages/currents which are greater than a threshold value for a selected period of time, as established by the dropout time for timer 59. Control switch 56 operates in similar fashion to control switch 36 of FIG. 2. Pulse generator 60 in FIG. 3 also operates in similar fashion to pulse generator 34 of FIG. 2.

The input phasor values in FIGS. 2 and 3 are shown as voltages from the power line. However, it should be understood that the input values from the power line, and hence the resulting phasors, could also be electrical current values or could be differential voltages or currents representing the voltage/current difference between two phasors of the power signal or other values, as discussed above. Typically, the possible input quantities will be the three phase voltages and the three phase currents, e.g. $V_a(t)$, $V_b(t)$ and $V_c(t)$; $I_a(t)$, $I_b(t)$ and $I_c(t)$. However, in addition to the three separate phase voltage inputs and the three separate current inputs, difference voltages or difference currents (between two phases) can be used. In summary, any of the following inputs can be used: $V_a(t)-V_b(t)$ $V_b(t)-V_c(t)$, and $V_c(t)-V_a(t)$. The difference currents include $I_a(t)-I_b(t)$, $I_b(t)-I_c(t)$ and $I_c(t)-I_a(t)$. Other sequence quantities, including negative, zero and positive sequence quantities, can be substituted for the disclosed phase quantities.

Hence, the delta filter system of the present invention is responsive to a variety of voltage and current inputs. In addition, these voltage and current inputs can be used directly or through a filtering system to produce either a time invariant phasor output or rotating (time varying) phasor output. By using the double reference approach of the present system, accurate results can be obtained relative to delta filter implementations for evolving faults.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A delta filter system for use in a protective relay for power systems, comprising:

an input portion for receiving electrical signal values representative of selected electrical quantities present on a power line;

a first comparison element for comparing said electrical signal values at a present point in time with said electrical signal values at a selected past point in time, each selected past point in time value being provided by a delay element and functioning as a first reference value;

circuit means for providing a first incremental signal quantity output if the past and present values are different, the first incremental signal quantity indicative of a change in the power system condition;

a memory for storing the present time electrical signal value following the appearance of said first incremental signal quantity output; and means using said stored electrical signal value as a fixed second reference value for future comparisons in a second comparison element beyond the point in time of the appearance of said first incremental signal quantity output to produce a second incremental signal quantity output if the power system continues to change.

2. A system of claim 1, wherein the electrical signal values are time-varying voltage or current values.

3. A system of claim 1, wherein the electrical signal values are time invariant phasor signals, and wherein the system includes a time invariant filter system, producing said time invariant phasor signals in response to voltage or current electrical signal quantities from the power line.

4. A system of claim 1, wherein the electrical signal values are rotating phasor signals, wherein the system includes a filter system producing said rotating phasor signals, in response to voltage or current electrical signal quantities from the power line, and wherein the apparatus further includes a circuit element for compensating for said rotating phasor to produce said fixed reference value.

5. A system of claim 1, including a threshold value source and a comparator for comparing an absolute value of the incremental signal quantity output with the threshold value, and a timer element for producing a timer output signal as long as said absolute value exceeds said threshold value, the timer output signal controlling the operation of a first switch which permits the reference signal value present at that time to be stored in said memory.

6. A system of claim 5, wherein the fixed reference value is stored in said memory for a time within the range of 0.5–4 cycles of the power system.

7. A system of claim 5, wherein the timer output signal has a duration which includes the dropout time of said timer element.

8. A system of claim 5, including a pulse generator responsive to said timer output signal for producing a pulse which controls a second switch which results in the second reference value being fixed for a selected period of time.

9. A system of claim 1, wherein the first comparison element uses the first reference value which changes as the power system changes and the second comparison element uses the second reference value which remains fixed for a period of time after a change in the power system.

* * * * *